US012240483B2

(12) United States Patent
Paradis et al.

(10) Patent No.: US 12,240,483 B2
(45) Date of Patent: *Mar. 4, 2025

(54) SYSTEMS AND METHODS TO INCREASE DRIVER AWARENESS OF EXTERIOR OCCURRENCES

(71) Applicant: TOYOTA MOTOR ENGINEERING & MANUFACTURING NORTH AMERICA, INC., Plano, TX (US)

(72) Inventors: Alexander L. Paradis, Ann Arbor, MI (US); Frank A. Richards, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,159

(22) Filed: Sep. 22, 2023

(65) Prior Publication Data

US 2024/0010222 A1 Jan. 11, 2024

Related U.S. Application Data

(63) Continuation of application No. 17/576,823, filed on Jan. 14, 2022, now Pat. No. 11,794,772.

(51) Int. Cl.
*B60W 50/16* (2020.01)
*B60W 40/08* (2012.01)
*B60W 50/14* (2020.01)

(52) U.S. Cl.
CPC ............ *B60W 50/16* (2013.01); *B60W 40/08* (2013.01); *B60W 2050/143* (2013.01); *B60W 2050/146* (2013.01); *B60W 2420/403* (2013.01); *B60W 2420/54* (2013.01); *B60W 2540/225* (2020.02)

(58) Field of Classification Search
CPC ................ B60W 50/16; B60W 40/08; B60W 2050/143; B60W 2050/146; B60W 2420/403; B60W 2420/54; B60W 2540/225

See application file for complete search history.

(56) References Cited

U.S. PATENT DOCUMENTS

| | | | |
|---|---|---|---|
| 10,783,559 B1* | 9/2020 | Tran | H04W 4/40 |
| 2013/0057671 A1* | 3/2013 | Levin | A61B 5/7221 |
| | | | 348/78 |
| 2016/0288717 A1* | 10/2016 | Kameshima | H04N 23/63 |
| 2018/0251122 A1* | 9/2018 | Golston | B60W 40/08 |
| 2019/0225228 A1* | 7/2019 | Gurusubramanian | |
| | | | G06V 20/597 |
| 2021/0101609 A1* | 4/2021 | Kim | G06F 18/256 |
| 2021/0213960 A1* | 7/2021 | Dingli | B60W 40/09 |
| 2022/0126837 A1* | 4/2022 | Croxford | B60W 50/16 |

* cited by examiner

Primary Examiner — Mohamed Barakat
(74) Attorney, Agent, or Firm — SHEPPARD, MULLIN, RICHTER & HAMPTON LLP; Daniel N. Yannuzzi

(57) ABSTRACT

Systems and methods are provided for increasing driver awareness of external audible and visual alerts. The external alerts may be detected by external sensors of a vehicle. Systems may use internal sensors to determine whether a driver of the vehicle appears aware of the external alert or whether the external alert is detectable inside the vehicle. If the driver does not appear aware of the external alert, or the external alert is not detectable inside the vehicle, the vehicle may broadcast an internal alert to the driver. The internal alert may be one or more of a visual alert, an audible alert, or a tactile alert.

11 Claims, 4 Drawing Sheets

SYSTEMS AND METHODS TO INCREASE DRIVER AWARENESS OF EXTERIOR OCCURRENCES

CROSS-REFERENCE TO RELATED APPLICATIONS

This application is a continuation of and claims the benefit of U.S. patent application Ser. No. 17/576,823 filed on Jan. 14, 2022, which is hereby incorporated herein by reference in its entirety for all purposes.

TECHNICAL FIELD

The present disclosure generally relates to improving driver awareness, and more specifically, to systems and methods that improve driver awareness of a vehicle's surrounding environment.

DESCRIPTION OF RELATED ART

Many vehicles include multiple sensors distributed throughout an interior and exterior of the vehicle. External sensors may monitor the vehicle's surrounding environment by detecting sounds, recording and analyzing images, determining proximity, etc. Internal sensors may monitor the vehicle's cabin and occupants by detecting sounds, recording and analyzing images, determining gestures, etc. The internal and external sensors may continuously or periodically collect data. However, the vehicle may not currently utilize different combinations of the internal and external sensor data.

Furthermore, drivers and passengers are more distracted and less focused on their surrounding environments due to technological advances. These advances include sound deadening insulation, autonomous driving, mobile media devices, among others. Distractions and reduced focus may lead to challenging or dangerous situations when the driver and other occupants do not recognize an environmental alert. For example, drivers must notice, understand, and react appropriately to the lights and sirens from emergency vehicles. Accordingly, a need exists for systems and methods to detect when drivers are unaware and unresponsive to environmental alerts and improve awareness of those alerts.

BRIEF SUMMARY OF THE DISCLOSURE

In accordance with one embodiment, a vehicle system comprises an internal visual sensor, an external visual sensor, an internal media device configured to present a media signal to an occupant of the vehicle, a memory configured to store one or more instructions, and a processor configured to process one or more instructions. The processor processes the one or more instructions to obtain an external visual signal generated outside the vehicle via the external visual sensor, obtain an internal visual signal corresponding to the external visual signal, and broadcast an indication of the external visual signal to the occupant of the vehicle via the internal media device based on a determination that an intensity of the internal visual signal falls below a brightness threshold.

In some embodiments, the indication of the external visual signal is an amplified version of the external visual signal.

In some embodiments, the system further comprises a tactile alert device configured to provide tactile alerts to the occupant. The processor may be further configured to process the one or more instructions to determine whether the occupant is aware of the external visual signal based on a response by the occupant to the broadcast indication or to the external visual signal, terminate the broadcast indication based on a determination that the occupant is aware of the external visual signal, and provide a tactile alert corresponding to the external visual signal to the occupant via the tactile alert device based on a determination that the occupant is not aware of the external visual signal.

In some embodiments, the response by the occupant comprises one or more of a tactile, audible, or visual acknowledgement or a change in operation of the vehicle.

In some embodiments, the change in operation of the vehicle comprises one or more of a reduction in speed of the vehicle, a changing of lanes by the vehicle, turning of the vehicle, or non-movement by the vehicle when movement is expected.

In some embodiments, the external visual sensor may be an external camera sensor configured to detect visual alerts outside the vehicle and the internal visual sensor may be an occupant sensor configured to monitor an attentiveness of the occupant. The processor may be further configured to process the one or more instructions to detect the external visual signal generated outside the vehicle via the external camera sensor, determine whether the occupant is aware of the external visual signal based on a response by the occupant to the external visual signal monitored by the occupant sensor, and broadcast an indication of the external visual signal to the occupant of the vehicle via the internal media device based on a determination that the occupant is not aware of the external visual signal.

In some embodiments, the occupant sensor is configured to monitor an attentiveness of the occupant based on monitoring eye movement of the occupant.

In some embodiments, the processor is further configured to process the one or more instructions to reduce a brightness of an internal source of light while the broadcast indication is broadcast to the occupant.

In some embodiments, the system further comprises a second external visual sensor. The processor may be further configured to process the one or more instructions to determine a direction of a source of the external visual signal relative to the vehicle. In some embodiments, the broadcast indication further indicates the direction of the source of the external visual signal to the occupant of the vehicle.

In some embodiments, the brightness threshold may be the brightness of the occurrence of the external visual input generated outside the vehicle.

In accordance with another embodiment, a vehicle system comprises a memory configured to store one or more instructions and a processor configured to process the one or more instructions. The processor may be configured to process the one or more instructions to obtain an external signal originating outside of a vehicle, compare the obtained external signal to a corresponding internal signal measured inside of the vehicle, and broadcast an indication of the external signal to an occupant of the vehicle via an internal media device based on a determination that an intensity level of the corresponding internal signal warrants additional notification to the occupant as compared to the intensity level of the external signal.

In accordance with another embodiment, a method of increasing driver awareness in a vehicle comprises obtaining from an external visual sensor, an occurrence outside the vehicle, obtaining from an internal visual sensor, an internal awareness of the external visual input, and broadcasting an indication of the external visual input to an occupant of the vehicle via an internal media device based on a determination that a brightness of the internal awareness falls below a brightness threshold.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
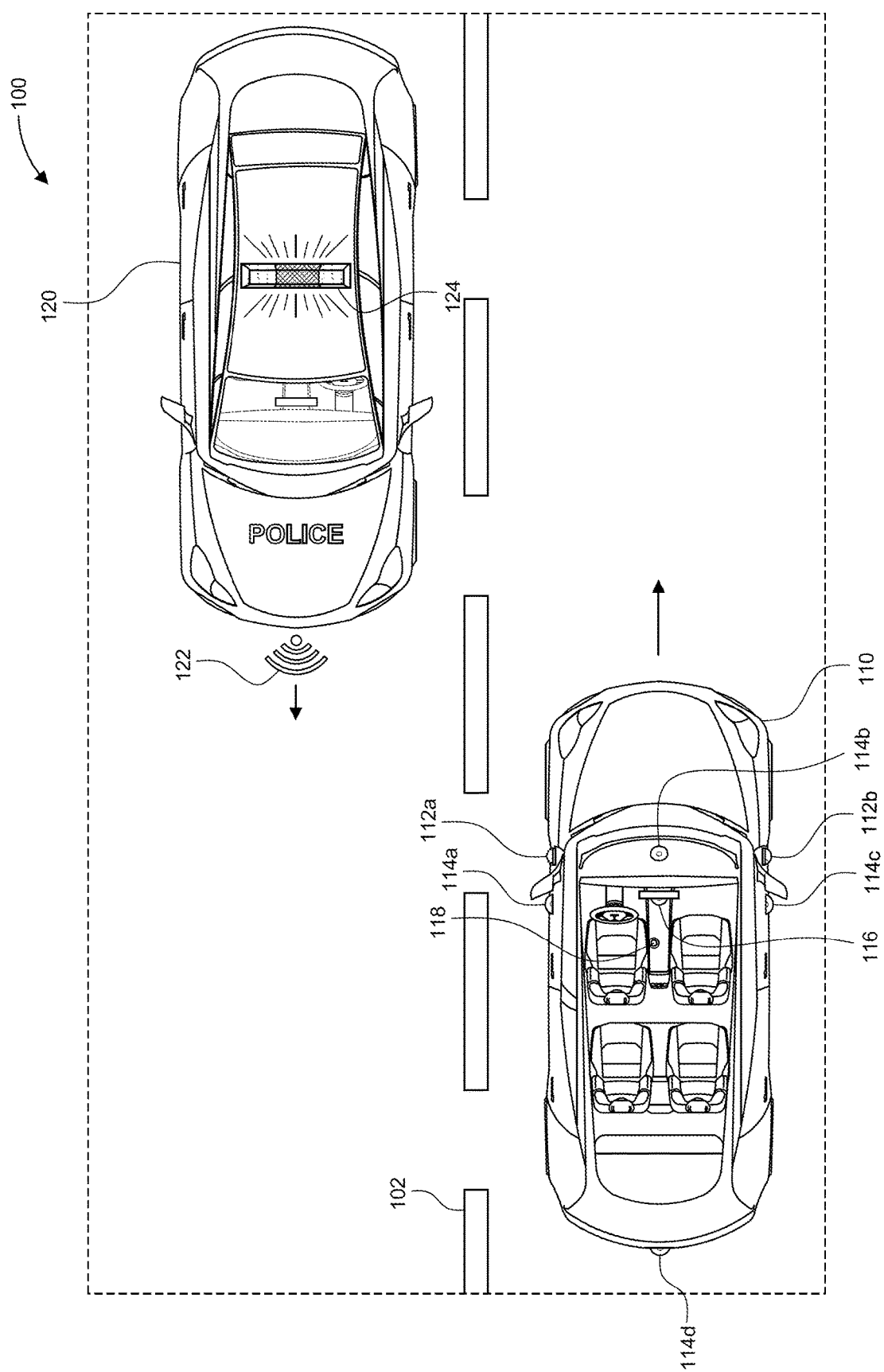
FIG. 1 is a top-down view of a vehicle environment in which embodiments of the systems and methods disclosed herein may be implemented.

The figures are not exhaustive and do not limit the present disclosure to the precise form disclosed.

DETAILED DESCRIPTION

Many vehicles use internal and external sensors to provide information to or about the vehicle. For example, a vehicle may include multiple internal and external sensors configured to detect sounds, capture images, or otherwise determine locations of one or more objects in the vicinity of the vehicle. Many times, information collected by the sensors is provided to an operator or occupant of the vehicle. For example, obstacles, road signs, etc., may be displayed on a visual interface to assist drivers. In another example, the vehicle may provide visual or audible alerts during parking using proximity sensors.

However, certain vehicle features may reduce occupant awareness of external occurrences. For example, tinted windows and improved sound suppression may reduce the driver's ability to monitor external visual and audible alerts. These features may result in reduced driver awareness of the vehicle's environment and lead to dangerous scenarios or conditions.

Embodiments of the systems and methods disclosed herein can increase driver awareness of exterior occurrences, warnings, and hazards by monitoring, amplifying, and projecting alerts detected in the environment of the vehicle. For example, the various external sensors of a vehicle, such as external microphones, cameras, and so forth, may detect an external visual and/or audible alert in the vehicle's environment. Internal sensors, such as internal microphones and cameras, monitor whether the external alert are identifiable inside the vehicle and any driver response to the external alerts. Based on this monitoring of the internal and external sensors, the vehicle may determine whether the driver is aware of the external alert. In some embodiments, where the vehicle detects that the driver is not aware of the external alert, the vehicle may broadcast the external alert inside the vehicle to ensure that the driver becomes aware of the alert. In some embodiments, regardless of whether the external alert is an audio or visual alert, the broadcast inside the vehicle may be one or more of audible, visual, or tactile.

Thus, the disclosed technology may employ various sensors distributed around a vehicle to detect audible and/or visual alerts outside of the vehicle and provide corresponding alerts inside of the vehicle to ensure that an occupant of the vehicle is aware of the alerts. The disclosed technology may enable the vehicle to determine whether the occupant is aware of the alerts. Where the occupant is aware of the alerts, the vehicle may refrain from broadcasting the alert inside the vehicle. However, where the occupant is not aware of the alert, the vehicle may broadcast the alert, for example, visually, audibly, or tactilely, inside the vehicle. The present disclosure is directed to using these existing sensors to increase occupant awareness of an external occurrence.

The systems and methods disclosed herein may be implemented in many different vehicle types and configurations. For example, the systems and methods disclosed herein may be used with automobiles, trucks, buses, boats, all-terrain vehicles, golf carts, recreational vehicles, airplanes, and other on- or off-road vehicles in which an operator or passenger (referred to herein interchangeably as "occupant") may need to be aware of an environment. In addition, the principals disclosed herein may also extend to other vehicle types as well.

FIG. 1 is a top-down view of a vehicle environment 100 in which embodiments of the systems and methods disclosed herein may be implemented. As shown, an operator's vehicle 110 is driving on a roadway 102 towards an emergency vehicle 120 that is approaching the vehicle 110 in another lane of the roadway 102. The emergency vehicle 120, as shown, is approaching while emitting an audible alert 122 and while its emergency lights 124 are flashing.

The vehicle 110 may comprise various external audio sensors 112a-112b (e.g., microphones) and visual sensors 114a-114d (e.g., cameras). The vehicle 110 also includes an internal audio sensor 116 (e.g., a microphone) and an internal visual sensor 118 (e.g., a camera). The external audio sensors 112a-112b may be configured to detect audible signals or alerts that are broadcast or emitted by a source that is outside of the vehicle 110. For example, any one of a siren, a horn honk, a yell, and so forth may comprise an audible alert that is detected by one or more of the external audio sensors 112a-112b. Similarly, the external visual sensors 114a-114d may be configured to detect visual signals or alerts that are broadcast or emitted by a source that is outside of the vehicle 110. Examples of the visual alert detected by one or more of the external visual sensors 114a-114d comprise indicator lights from emergency vehicles, flashes of headlights from other vehicles, waving of hands or another object, and so forth.

In some embodiments, the vehicle 110 comprises one or more vehicle systems configured to process the audible and/or visual alerts. For example, the audio sensors 112a-112b may be coupled to an audio processing system of the vehicle 110 configured to process audible alerts detected by the audio sensors 112a-112b. Where both of the audio sensors 112a-112b detect one audible alert, the audio processing system may process signals or data received from each of the audio sensors 112. Such processing may determine one or more of a general direction of a source of the one audible alert relative to the vehicle 110 (such as in front of the vehicle 110, behind the vehicle 110, etc.), a general distance of the source from the vehicle 110, a type of source (such as a honking horn, a vehicle alarm, an emergency vehicle siren, a local emergency alerts systems, and so forth), and the like.

Similarly, the visual sensors 114a-114d may be coupled to a visual processing system of the vehicle 110 configured to process visual alerts detected by the visual sensors 114a-114d. For example, where more than one of the visual sensors 114a-114d detect a visual alert, the visual processing system may process signals or data received from each of the visual sensors 114. Such processing may determine one or more of a general direction of a source of the visual alert relative to the vehicle 110 (such as in front of the vehicle 110, behind the vehicle 110, etc.), a general distance of the source from the vehicle 110, a type of source (such as emergency lights on an emergency vehicle, flashing lights of a neighboring vehicle, and so forth), and the like. In some embodiments, the audio and visual processing systems may be integrated into a single system or be separate systems.

In some embodiments, where the audio sensors 112 and the visual sensors 114 both detect audio and visual alerts at substantially the same time and the audio and visual processing systems determine that the sources for the audio and visual alerts are at the same direction and distance relative to the vehicle 110, these processing systems may determine that a single source produces both alerts, such as the emergency vehicle 120 having both its siren and emergency lights active.

The audio and visual processing systems may also be coupled to the corresponding internal audio sensor 116 and the internal visual sensor 118 to determine whether corresponding external alerts are detectable inside the vehicle 110.

For example, one or both of the external audio sensors 112a-112b detects an audible alert that the audio processing system determines is a siren from, for example, the emergency vehicle 120. The audio processing system may monitor the internal audio sensor 116 to determine whether the same audible alert is detectable inside the vehicle 110 or detected at a reduced volume or intensity inside the vehicle 110. Where the audible alert is not detectable inside the vehicle 110, or where a volume or intensity of the audible alert at the internal audio sensor 116 is below a threshold, the audio processing system may amplify the audible alert or generate an internal alert to the occupant of the vehicle 110. In some embodiments, the threshold can be established by the occupant of the vehicle 110 or is established by a manufacturer of the vehicle 110. In some embodiments, the internal alert may comprise one or more of an audible alert through speakers, a visual alert via a multimedia or heads up display, and/or a tactile alert through vibration of a steering wheel, seat, or other component of the vehicle 110.

In some embodiments, the audio processing system may determine that the audible alert from outside the vehicle 110 cannot be heard by the occupant of the vehicle 110 due to a noise level inside the vehicle (for example, due to loud music, phone calls, etc.). In such a case, the audio processing system may decrease the noise level inside the vehicle 110 by reducing the volume of music, interrupting phone calls, and the like. In some embodiments, the internal alert broadcast inside the vehicle 110 may indicate a determined source of the audible alert or a direction of the source of the audible alert relative to the vehicle 110. In some embodiments, the internal alert may be broadcasted to the occupant of the vehicle 110 via an internal media device when it is determined that the external alert was not noticed. The audio processing system may compare an intensity of the external alert as measured inside the vehicle 110 to the intensity of the external alert as measured outside the vehicle 110. Based on this comparison, an internal media device may provide the internal alert to the occupant.

Similarly, where one or more of the external visual sensors 114a-114d detects a visual alert that the visual processing system determines is a light from, for example, the emergency vehicle 120, the visual processing system may further monitor the internal visual sensors 118 to determine whether the same visual alert is detectable inside the vehicle 110. Where the visual alert is not detectable inside the vehicle 110, or where an intensity or brightness of the visual alert is below a threshold, the visual processing system may determine to amplify the visual alert or generate an internal alert to the occupant of the vehicle 110. In some embodiments, the threshold can be established by the occupant of the vehicle 110 or is established by a manufacturer of the vehicle 110. The internal alert generated in response to the external visual alert may be correspond to the internal alert described above with respect to the external audible alert.

In some embodiments, the visual processing system may determine that the visual alert from outside the vehicle 110 cannot be seen by the occupant of the vehicle 110 because of a light level inside the vehicle (for example, due to interior lights, sunlight, etc.). In such a case, the visual processing system may decrease the brightness or intensity of the interior lights, and so forth. In some embodiments, the internal alert broadcast inside the vehicle 110 may indicate a determined source of the visual alert or a direction of the source of the visual alert relative to the vehicle 110. In some embodiments, tactile alerts may be provided to the occupant in addition to or instead of either or both of the visual and audible internal alert. Examples of such tactile alerts include vibrating the steering wheel, or a portion thereof, vibrating the occupant's seat, or a portion thereof, and so forth. In some embodiments, the internal alert may be broadcast to the occupant of the vehicle 110 via the internal media device when it is determined that the external alert was not noticed. The visual processing system may compare an intensity of the external alert as measured inside the vehicle 110 to the intensity of the external alert as measured outside the vehicle 110. Based on this comparison, the internal media device may provide the internal alert to the occupant.

In some embodiments, the internal visual sensor 118 and the internal audio sensor 116 may monitor the occupant of the vehicle 110 to determine whether the occupant is aware of or responding to the external alert, audible or visual. For example, the internal visual sensor 118, in conjunction with the visual processing system, may determine whether the occupant is aware of the external alert based on the occupant's gaze, movements, actions, and so forth. More specifically, the internal visual sensor 118, or other sensors internal to the vehicle 110, may monitor one or more of the occupant's gaze, movements, actions, and so forth relative to before and after the external alert is detected by the external audio and visual sensors 112, 114, respectively. In some embodiments, the visual processing system may monitor the occupant's gaze, movements, or actions or monitor the vehicle 110 actions and analyze changes therein to determine whether the occupant appears aware of and/or is taking actions in response to the external alert.

For example, the internal visual sensor 118 may identify that the occupant's gaze shifts between mirrors or out the windows of the vehicle 110 within a threshold time of the external alert being detected by the external audio sensors 112a-112b or the external visual sensors 114a-114d. Thus, the visual processing system may determine that the occupant is aware of the external alert. Similarly, if the internal visual sensor 118 identifies that the occupant turns the occupant's head or body to better view the environment of the vehicle 110 or turns or slows the vehicle 110 within the threshold time of the external alert being detected, the visual processing system may determine that the occupant is aware of the external alert. In some embodiments, other internal sensors that may help determine whether the occupant is aware of the external alert include touch sensors, pressure sensors, seat sensors, motion sensors, and so forth in conjunction with corresponding a processing system. Thus, detection of a change of the occupant's gaze, movements, or actions, or a change in the movement of the vehicle 110 when compared before and after detection of the external alert may indicate that the occupant appears aware of the external alert.

In circumstances where the visual processing system determines that the occupant does not appear aware of the external alert, the internal alert introduced above may be broadcast inside the vehicle 110. For example, if the occupant does not react to the external alert, one or more of the visual, audible, or tactile internal alerts may be broadcast to the occupant.

In some embodiments, the internal alert may request feedback from the occupant, such as asking the occupant to confirm awareness of the external alert. Such feedback may be requested and/or provided verbally, visually, or physically.

Though not described in detail herein, the vehicle 110 may include various common components, such as a motive power source, fuel or energy storage components, control components and systems, occupant amenities, and the like.

In some embodiments, the control components and systems include an electronic control unit (ECU) that assists in controlling one or more vehicle components. For example, the electronic control unit may control one or more occupant amenities, such as audio/visual equipment (such as the radio, interior lights, interior user interfaces, etc.), and so forth. The electronic control unit may include various circuitry to control aspects of the vehicle operation introduced above. The electronic control unit may include, for example, a microcomputer that includes a one or more processing units (e.g., microprocessors), memory storage (e.g., RAM, ROM, etc.), and I/O devices. The processing units of the electronic control unit may execute instructions stored in the memory storage to control one or more systems or subsystems in the vehicle 110.

As introduced above, the vehicle 110 can include a plurality of sensors to detect various conditions internal or external to the vehicle 110, such as the audio sensors 112, the visual sensors 114, the internal audio sensor 116, the internal visual sensor 118, seat occupancy sensors, and so forth. These sensors can be integrated with the electronic control unit to monitor and/or control vehicle operating conditions or characteristics, occupant accessories, occupant signaling, and the like.

In some embodiments, one or more of the sensors include their own processing capability (such as via the audio and visual processing systems introduced above) to analyze information from the corresponding sensors and compute results based thereon that can be provided to the electronic control unit. In other embodiments, one or more sensors may be data-gathering-only sensors that provide only raw data to the electronic control unit. In further embodiments, hybrid sensors may be included that provide a combination of raw data and processed data to the electronic control unit. The sensors may provide an analog output or a digital output.

As described herein, the sensors may detect external and/or internal events and/or conditions. In addition to the microphone or camera sensors introduced above, the sensors may further comprise sonar, radar, lidar, or other proximity sensors or image sensors. In some embodiments, the sensors can detect, for example, vehicles in the roadway, traffic signals, obstacles, neighboring vehicles, and so on, when the vehicle 110 is idle or in motion.

Figure 2A:
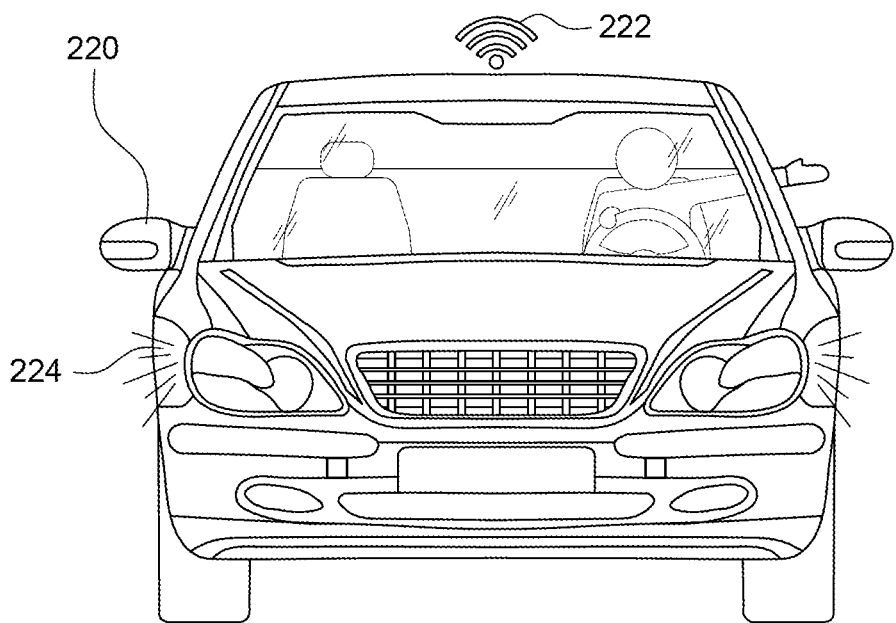
FIGS. 2A-2D provide examples of sources of the external alert introduced above and for which systems and methods are implemented by embodiments described herein.
Figure 2B:
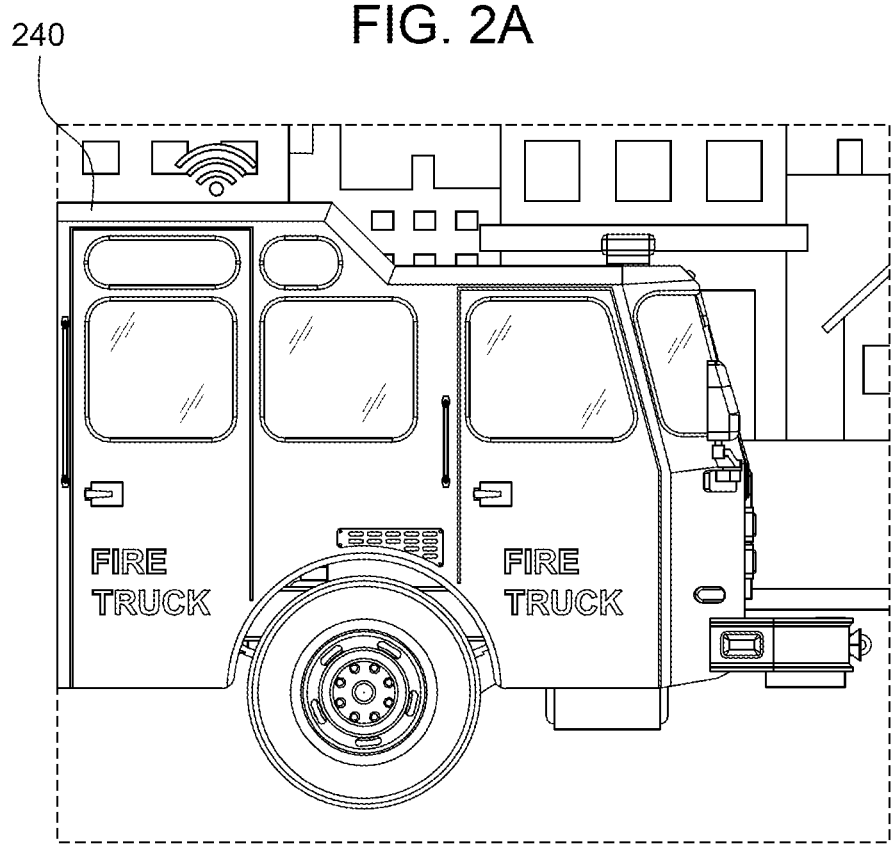
Figure 2C:
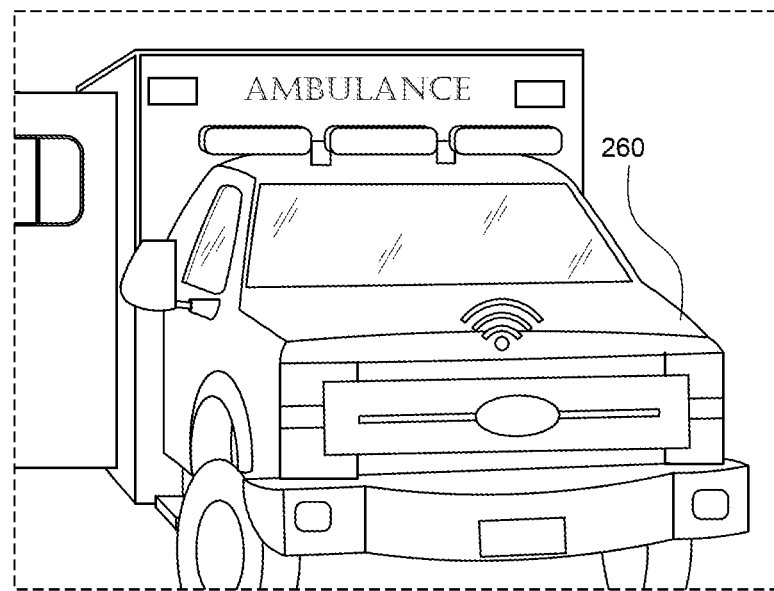
Figure 2D:
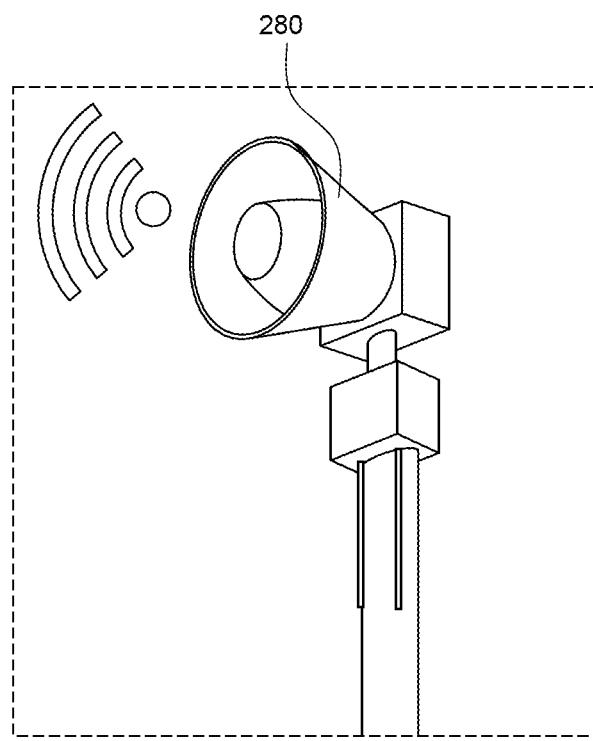

FIGS. 2A-2D provide examples of sources of the external alert introduced above and for which systems and methods are implemented by embodiments described herein. For example, FIG. 2A provides an example of another emergency vehicle 220 flashing its headlights and with a siren or horn active, thereby creating external alerts that the vehicle 110 can detect. FIG. 2B provides an example emergency vehicle 240 that is emitting an audible alert, thereby creating one or more external alerts that the vehicle 110 can detect. FIG. 2C provides another example emergency vehicle 260 that is flashing its emergency lights, thereby creating one or more external alerts that the vehicle 110 can detect. FIG. 2D provides an example horn 280 that is emitting an audible alert, thereby creating one or more external alerts that the vehicle 110 can detect. In response to each of these alerts, the vehicle 110 may amplify the external alert or otherwise broadcast an internal alert to the occupant without monitoring or monitor occupant awareness of the external alert. Thus, the vehicle 110 may ensure that the occupant is aware of or becomes aware of the external alert and enables the occupant to safely operate the vehicle 110 in response thereto, as needed.

Figure 3:
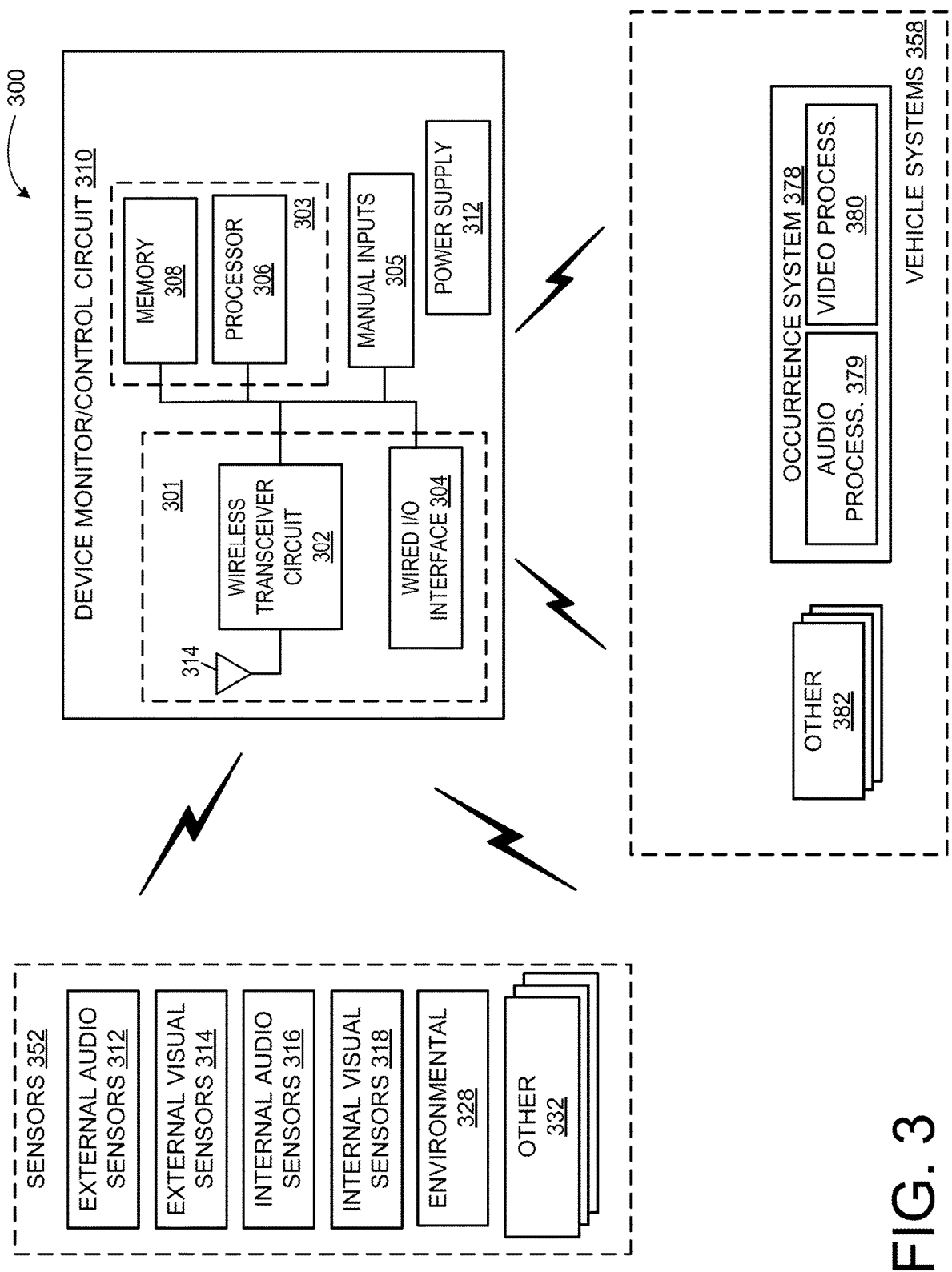
FIG. 3 illustrates an example architecture for monitoring for and reacting to an external alert in accordance with one embodiment of the systems and methods described herein.

FIG. 3 illustrates an example architecture for monitoring for and reacting to an external alert, in accordance with embodiments of the systems and methods described herein.

Referring now to FIG. 3, in this example, a device control system 300 includes a device monitor/control circuit 310, a plurality of sensors 352, and a plurality of vehicle systems 358. The sensors 352 and vehicle systems 358 can communicate with the device monitor/control circuit 310 via a wired or wireless communication interface or bus. Although the sensors 352 and vehicle systems 358 are depicted as communicating directly with the device monitor/control circuit 310, they can also communicate with each other as well as with other vehicle systems. The device monitor/control circuit 310 can be implemented as an ECU or as part of an ECU, such as the electronic control unit introduced above. In other embodiments, the device monitor/control circuit 310 can be implemented independently of the ECU.

The device monitor/control circuit 310 in this example includes a communication circuit 301, a decision circuit 303 (including a processor 306 and memory 308 in this example) and a power supply 312. Components of the device monitor/control circuit 310 are illustrated as communicating with each other via a data bus, although other communication interfaces can be included. The device monitor/control circuit 310 in this example also includes one or more manual inputs 305 that can be operated by the occupant to manually control the device 110, if applicable.

The processor 306 can include a GPU, CPU, microprocessor, or any other suitable processing system. The memory 308 may include one or more various forms of memory or data storage (e.g., flash, RAM, etc.) that may be used to store calibration parameters, images (analysis or historic), point parameters, instructions, and variables for the processor 306 as well as any other suitable information. The memory 308 can be made up of one or more modules of one or more different types of memory and may be configured to store data and other information as well as operational instructions that may be used by the processor 306 to the device monitor/control circuit 310.

Although the example of FIG. 3 is illustrated using the processor 306 and the memory 308, as described below with reference to circuits disclosed herein, the decision circuit 303 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up the device monitor/control circuit 310.

The communication circuit 301 may comprise either or both a wireless transceiver circuit 302 with an associated antenna 314 and a wired I/O interface 304 with an associated hardwired data port (not illustrated). As this example illustrates, communications with the device monitor/control circuit 310 can include either or both wired and wireless communications circuits 301. The wireless transceiver circuit 302 can include a transmitter and a receiver (not shown) to allow wireless communications via any of a number of communication protocols such as, for example, Wi-Fi, Bluetooth, near field communications (NFC), Zigbee, and any of a number of other wireless communication protocols whether standardized, proprietary, open, point-to-point, networked or otherwise. The antenna 314 is coupled to the wireless transceiver circuit 302 and is used by the wireless transceiver circuit 302 to transmit radio (RF) signals wirelessly to wireless equipment with which it is connected and to receive radio (RF) signals as well. These RF signals can include information of almost any sort that is sent or received by the device monitor/control circuit 310 to/from other entities such as the sensors 352 and vehicle systems 358.

The wired I/O interface 304 can include a transmitter and a receiver (not shown) for hardwired communications with other devices. For example, the wired I/O interface 304 can provide a hardwired interface to other components, including the sensors 352 and vehicle systems 358. The wired I/O interface 304 can communicate with other devices using Ethernet or any of a number of other wired communication protocols whether standardized, proprietary, open, point-to-point, networked or otherwise.

The power supply 312 can include one or more of a battery or batteries (such as, e.g., Li-ion, Li-Polymer, NiMH, NiCad, NiZn, and NiH$_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply.

The sensors 352 can include, for example, the sensors described above with reference to the example of FIG. 1, such as one or more of external audio sensors 312 (corresponding to the external audio sensors 112a-112b), external visual sensors 314 (corresponding to the external visual sensors 114a-114d), internal audio sensor 316 (corresponding to the internal audio sensors 116), internal visual sensor 318 (corresponding to the internal visual sensors 118), environmental sensors 328 (e.g., to detect one or more environmental conditions), and so forth. Additional sensors 332, such as the seat occupancy sensors, proximity sensors, etc., introduced above, can also be included as may be appropriate for a given implementation of the device control system 300.

The vehicle systems 358 can include any of a number of different vehicle components or subsystems used to control or monitor various aspects of the vehicle and its performance. In this example, the vehicle systems 358 include occurrence (or alert) processing systems 378 to monitor and process signals received from the external audio sensors, the external visual sensors 314, the internal audio sensors 316, and the internal visual sensors 318, among others. The occurrence system 378 may be integrated with other systems of the vehicle 110. The occurrence system 378 may comprise an audio processing system 379, corresponding to the audio processing system described above, and a visual processing system 380, corresponding to the visual processing system described above. The vehicle systems 358 may further include other vehicle systems 382. The occurrence system 378 may comprise one or more processing, storage, or similar components that enable monitoring, processing, and analysis of visual and audible signals received from corresponding sensors.

During operation, as introduced above, the device monitor/control circuit 310 can receive information from various vehicle sensors 352 to determine whether an external alert exists. Where the device monitor/control circuit 310 determines that the external alert does exist, the device monitor/control circuit 310 may further broadcast the external alert inside the vehicle 110 as an internal alert or broadcast the internal alert indicating to the occupant of the vehicle 110 that the external alert exists. As introduced above, the device monitor/control circuit 310 may monitor the occupant of the vehicle 110 to determine a need to broadcast the internal alert, where the internal alert is broadcast upon detection that the occupant does not appear aware of or to be reacting to the external alert.

In various embodiments, the communication circuit 301 can be configured to receive data and other information from the sensors 352 that is used in determining whether the external alert exists and whether to broadcast the internal alert. Additionally, the communication circuit 301 can be used to send an alert or interlock to various vehicle systems 358 as part of monitoring for or processing the external alert, monitoring the occupant's awareness of the external alert, and/or broadcast of the internal alert. For example, the communication circuit 301 can be used to communicate signals from the sensors 352 to, for example, the occurrence system 378. The occurrence system 378 may use the sensor data to determine whether the external alert exists and/or when to broadcast the internal alert. Additionally, the occurrence system 378 may determine a type of source and a location of the source of the external alert relative to the vehicle 110 to enable indication of the type of source and the location of the source to the occupant of the vehicle 110, for example, as part of the internal alert. For example, the occurrence system 378 receives data indicating that the external alert is coming from behind the vehicle 110. The occurrence system 378 may, in response, indicate to the occupant of the vehicle 110 that there is an external alert behind the vehicle 110 and that appropriate action may be required. In some instances, as described above, the occurrence system 378 controls broadcasting the external alert inside the vehicle 110, amplifying a volume or amplitude of the external alert to make it more noticeable for the occupant. Accordingly, the occurrence system 378 may make the occupant aware of external alerts or ensure that the occupant is aware of external alerts, thereby improving safety of the occupant and the vehicle 110 in various conditions that could lead to or result from the external alerts or conditions related thereto.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto, such as the decision circuit 303.

In this document, the terms "computer program medium" and "computer usable medium" are used to generally refer to transitory or non-transitory media. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the decision circuit 303 to perform features or functions of the present application as discussed herein.

It should be understood that the various features, aspects, and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle system comprising:
an internal media device configured to present a media signal to an occupant of the vehicle;
one or more processors communicatively coupled to an external visual sensor and an internal visual sensor;
a memory storing instructions, which when executed by the one or more processors cause the one or more processors to:
obtain from the external visual sensor, an occurrence of an external visual input generated outside the vehicle;
obtain from the internal visual sensor, an internal awareness of the external visual input;
broadcast an indication of the external visual input to the occupant of the vehicle via the internal media device based on a determination that a brightness of the internal awareness falls below a brightness threshold; and
reduce an intensity of an internal source of light while broadcasting the indication to the occupant.

2. The vehicle system of claim 1, wherein the indication of the external visual input is a visual alert.

3. The vehicle system of claim 1, further comprising:
a tactile alert device configured to provide tactile alerts to the occupant,
wherein the instructions further cause the one or more processors to:
determine whether the occupant is aware of the external visual input based on a response by the occupant to the broadcast indication or to the external visual input;
terminate the broadcast indication based on a determination that the occupant is aware of the external visual input; and
provide a tactile alert corresponding to the external visual input to the occupant via the tactile alert device based on a determination that the occupant is not aware of the external visual input.

4. The vehicle system of claim 3, wherein the response by the occupant comprises one or more of a tactile, audible, or visual acknowledgement or a change in operation of the vehicle.

5. The vehicle system of claim 4, wherein the change in operation of the vehicle comprises one or more of a reduction in speed of the vehicle, a changing of lanes by the vehicle, turning of the vehicle, or non-movement by the vehicle when movement is expected.

6. The vehicle system of claim 1, wherein the external visual sensor is a camera sensor configured to detect visual alerts outside the vehicle; and wherein the internal visual sensor is an occupant sensor configured to monitor an attentiveness of the occupant.

7. The vehicle system of claim 6, wherein the occupant sensor is configured to monitor the attentiveness of the occupant based on monitoring eye movement of the occupant.

8. The vehicle system of claim 1, further comprising a second external visual sensor, wherein the instructions further cause the one or more processors to:

determine a direction of a source of the external visual input relative to the vehicle; and wherein the broadcast indication further indicates the direction of the source of the external visual input to the occupant of the vehicle.

9. The vehicle system of claim 1, wherein the brightness threshold is the brightness of the occurrence of the external visual input generated outside the vehicle.

10. A vehicle system comprising:
a memory configured to store one or more instructions;
a processor configured to process the one or more instructions to:
  detect an external visual signal originating outside of a vehicle;
  compare the detected external visual signal to a corresponding internal visual signal measured inside of the vehicle;
  broadcast an indication of the external visual signal to an occupant of the vehicle via an internal media device based on a determination that an intensity level of the corresponding internal visual signal warrants notification to the occupant as compared to an intensity level of the external visual signal; and
  reduce an intensity of an internal source of light while broadcasting the indication to the occupant.

11. A method of increasing driver awareness in a vehicle, comprising:
obtaining from an external visual sensor, an occurrence of an external visual input generated outside the vehicle;
obtaining from an internal visual sensor, an internal awareness of the external visual input;
broadcasting an indication of the external visual input to an occupant of the vehicle via an internal media device based on a determination that a brightness of the internal awareness falls below a brightness threshold; and
reducing an intensity of an internal source of light while broadcasting the indication to the occupant.

* * * * *